Feb. 21, 1950     C. W. BRÄCKER     2,498,525
DRILL CHUCK
Filed Feb. 18, 1947     2 Sheets-Sheet 1
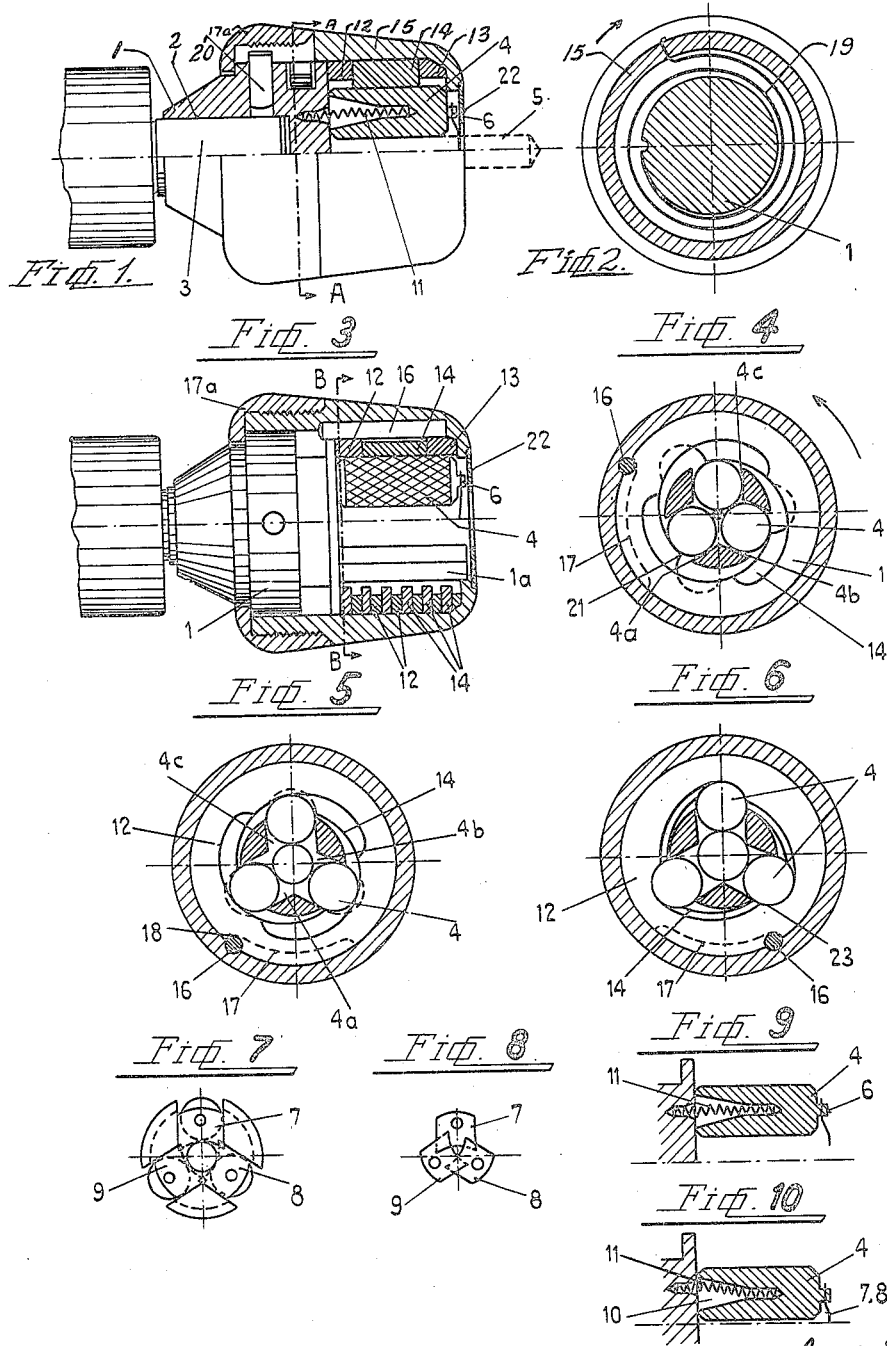

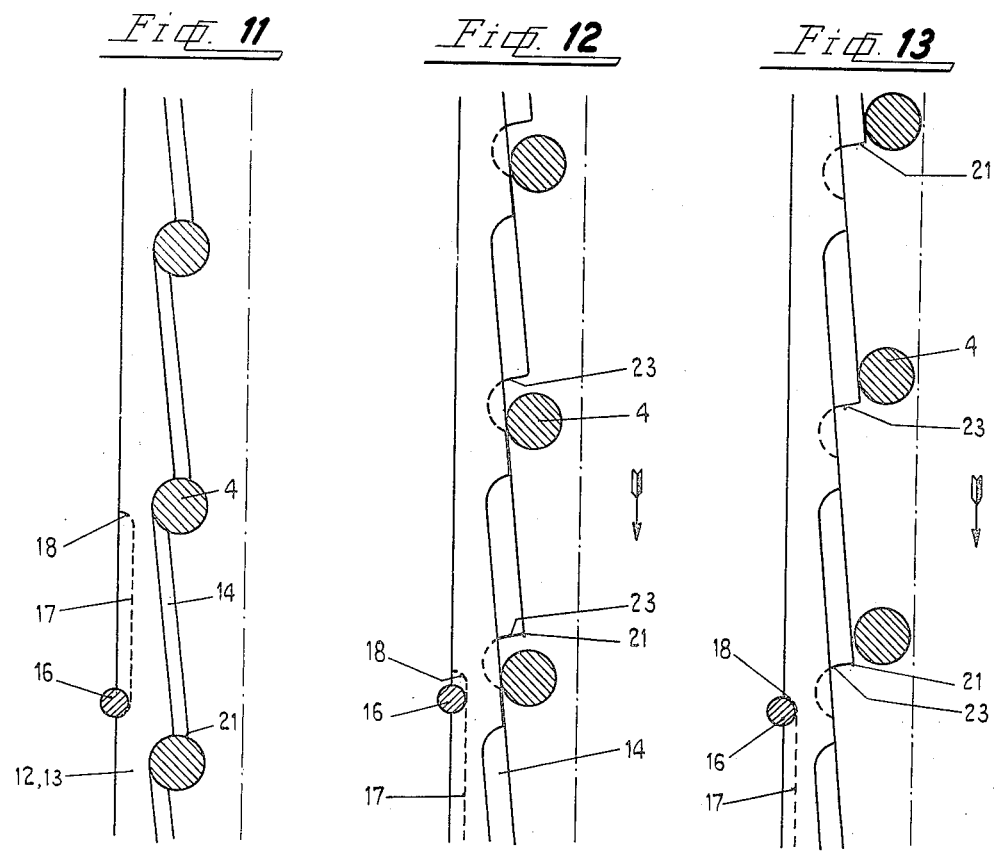

Patented Feb. 21, 1950

2,498,525

UNITED STATES PATENT OFFICE 2,498,525

DRILL CHUCK

Carl Walter Bräcker, Pfaffikon, Switzerland

Application February 18, 1947, Serial No. 729,327
In Switzerland December 21, 1945

8 Claims. (Cl. 279—72)

This invention relates to drill chucks, and particularly to a novel mechanism to actuate the drill holding members.

A main object of my invention is to provide for a drill chuck of compact construction adapted for use with drills varying over a wide range in diameters.

Another object of this invention is to increase the efficiency of the clamping mechanism and to adapt said mechanism for rapid exchange of the drills, either at standstill or while the machine is running.

Another object of my invention is to provide a drill chuck without any projecting parts such as teeth, whereby accidents resulting from such projecting parts are prevented.

Still another object of the present invention is to provide a drill chuck maintaining throughout its operation a high standard of precision.

I attain this and related objects by a drill chuck comprising: a drill chuck head, drill holding members and a rotatable shell housing, resilient means urging the drill holding members outward in radial direction to a position corresponding to the maximum range of the drill chuck, and other resilient means urging the rotatable shell type housing to rotate in a direction corresponding to the minimum drill chuck range; to guide the drill holding members, at least one other guide disk frictionally coupled to the shell housing for intermittently rotating with said shell-housing, the two sets of disks guiding the drill holding members from a minimum to a maximum drill size shaft range, whereby the guide disks coupled frictionally to the rotatable shell housing guide the drill holding members from the minimum range to an intermediate position of the total range, and the other guide disks from said intermediate position to the maximum range of the drill chuck, operable by rotating the shell-housing in a direction opposing said other resilient means.

Other details will be apparent from the description of the device illustrated in the accompanying drawings, in which is:

Figure 1 a longitudinal sectional elevation of a drill chuck according to this invention, Figure 2 a section on the line A—A of Figure 1, Figure 3 a longitudinal sectional elevation showing the drill chuck in a different position from that shown in Figure 1, also showing at the lower half a modified constructional form from that shown in Figure 1, Figure 4 a section approximately on the line B—B of Figure 3 showing the clamping members in a position indicating the minimum range of the drill chuck, Figure 5 a similar section as shown in Figure 4 showing drill holding clamping members, in a different position, Figure 6 a similar section as shown in Figure 4 showing a position of the clamping members, indicating the maximum range of the drill chuck, Figure 7 a detail seen from the front of the drill chuck, Figure 8 a detail similar to that shown in Figure 7 in another phase of the drill holding members, Figure 9 a detail of a clamping member, Figure 10 a clamping member in another position from that shown in Figure 9.

The Figures 11, 12 and 13 are diagrammatic views referring to the actuating mechanism for the clamping members showing the guide disks in straight laid out position, their circumference being represented as the straight base-line, in three different positions of the clamping members.

Referring to Figure 1, the centrally located member 1 referred to as the chuck head is provided with a bore 2, engaging in any well known manner the machine shaft 3.

The forward end of the drill chuck head 1 is milled and bored to provide for radially disposed slots such as indicated by the numerals 4a, 4b and 4c for the clamping or drill holding members of round section in the form of rollers 4. These rollers are movably disposed in the slots 4a, 4b and 4c and are provided with knurled or milled surfaces effecting thereby a firm grip on the shaft of the drill.

The rollers 4 are independent from each other and are provided at the forward end with extensions 6, which serve as mountings for plates 7, 8 and 9. These plates are identically formed and follow the movement in radial direction of the clamps 4; specific positions of these plates are shown in the Figures 7 and 8.

The plates 7, 8 and 9 are longitudinally displaced so as to clear each other when in a position shown in Figure 8. The purpose of these plates is to prevent the waste-material from the boring to enter the drill chuck, in that a very small space between these plates and a cover-plate 22 is provided.

The clamps 4 are provided with a flared blind bore-hole 10 as shown. In this bore 10 one end of spring 11 is firmly secured in the cylindric end-part of this hole, the other end is rigidly connected in a hole of the chuck head.

Between the head 1 and the shell type housing 15 a spiral spring 19 is disposed and holds with one end the shell type housing 15 and with the other end the chuck head 1. This spring serves to rotatably displace the drill chuck head and the shell-housing in relation to each other, so as to keep the clamping members in the closed position unless interfered with, in this respect, from the outside. A pin 20 seated in the drill chuck head 1 provides for a stop limiting the movement of the shell 15 in that the stop abuts the ends of a groove in the shell-housing.

The clamp rollers 4 are controlled by mechanism consisting of members 12, 13 and 14 shaped as guide-disks for the clamping members 4, in that they are provided with suitably curved inside surfaces, guiding the resilient radial movements of the clamps 4 while engaging the shaft of a drill tool under the pressure of spring 19 after the shell has been rotated in direction opposite the pressure of said spring.

The guide disks 12, 13 and the guide disk 14 provide together the guiding surfaces, controlling the clamp rollers 4.

The guiding or controlling surfaces of the guide rings 12 and 13 are identical in shape and are by means of a pin 16 firmly or integrally secured to the rotatable shell 15.

The rotatable shell 15 is longitudinally fixed by means of a cap nut 17a preventing displacement in axial direction of the guide disks 12 and 13, which are rigidly connected to the shell 15.

The guide disk 14 is rotatably disposed within the shell 15, between the guide disks 12 and 13, rotating with the shell 15 by frictional coupling, but may also be held fixed in a firm position while the shell 15 and the guide disks 12 and 13 are rotated. The mechanism pertaining to this function consists according the accompanying drawings in a circumferential notch 17 cooperating with the pin 16. Relative movements between the guide disk 14 and the guide disks 12 and 13 is thereby limited according the angular length of the notch 17 preferably to an angular movement of 90°.

The controlling members 12, 13 and 14 may also consist of guide disks as shown in the lower part of Figure 3. In this case disks 14 for limited movements are arranged between disks 12 for unlimited movement.

The radial movement of the clamping rollers 4, from their minimum drill holding range shown in Figure 4, to the drill holding range shown in Figure 5, is controlled by the guide disk 14 alone. From there on the guide disks 12 and 13 cooperate equally and alone with the clamping rollers 4. During the latter operation, the movement of guide disk 14 is interfered with by the abutments 21 and the guide rollers 4, see also Figure 12. From this instant on the guide disks 12 and 13 may be moved on, alone, in that the pin 16 travels in the notch 17 of the guide disk 14, from one end to the other end of the notch. In other words when rotating the shell 15 in the direction in which the spiral spring 19 is wound up, the clamp rollers 4 move in the grooves 4a, 4b and 4c due to the springs 11 which urge the clamp rollers in radial direction towards the outside against the guide surface of disk 14. The control members 12, 13 and 14 rotate simultaneously with the shell 15 until the clamping rollers 4 abut the elevated position 21 of the guide disk 14. Beginning at this instant, the rollers 4 glide on the controlling surface of the guide disks 12 and 13 until the range of greatest magnitude is attained as shown in Figure 6 and diagrammatically shown in Figure 11. During this period, the pin 16 moved between the two abutments 18 of the notch 17 and the clamping rollers 4 are guided by the control surfaces of the guide disks 12, 13 and are located in a rest-position 23 of the guide disk 14.

The operation of the two control surfaces of the disks 12, 13 and the control-surface of the disk 14 is illustrated diagrammatically in the Figures 11, 12 and 13.

The open position of the drill chuck is shown in the Figures 6 and 11. Figures 5 and 12 show an intermediate position of the drill chuck range corresponding to the end of the active movement of the control or guide disk 14. The control surfaces of the rings 12 and 13 in the position shown in Figure 11 have been displaced from the position shown in Figure 12 in that they have been further rotated and the disk 14 due to its collision with abutment 21 has been held fixed whereby the pin 16 travelled in the notch 17.

The illustration of Figure 13 corresponds to the illustration shown in Figure 4 and shows the clamping rollers 4 almost on the highest elevation of cam 21 of the control ring 14, enabling them to grip a tool of small diameter.

I claim:

1. A drill chuck comprising a chuck head, drill holding members and a rotatable shell housing, resilient means urging the drill holding members in radial direction to a position corresponding to the maximum range of the drill chuck, and other resilient means urging the rotatable shell type housing to rotate in a direction corresponding to the minimum drill chuck range, a guide disk rigidly connected to the shell housing to guide the drill holding members, a second guide disk frictionally coupled to the shell housing for intermittently rotating with said shell-housing, said disks guiding the drill holding members from a minimum to a maximum drill size shaft range, whereby said guide disk coupled frictionally to the rotatable shell-housing guides the drill holding members from the minimum range to an intermediate position of the total range, and the other guide disk from said intermediate position to the maximum range of the drill chuck, said disks being operable by rotating the shell-housing in a direction opposing said other resilient means.

2. A drill chuck as set forth in claim 1, wherein said frictionally coupled guide disk has an elevated surface abutting said drill holding members rendering said frictional coupling ineffective and said first mentioned guide disk effective to guide said drill holding members to their maximum range and means rotating said first mentioned guide disk while the frictionally coupled guide disk is held fixed by said drill holding members.

3. A drill chuck as set forth in claim 2, in which said means rotating said first mentioned guide disk, comprises a circumferential notch in said frictionally coupled guide disk, and a pin travelling in said notch securing said first mentioned guide disk to the shell-housing.

4. A drill chuck as set forth in claim 3 wherein two rigidly coupled guide disks are provided having identical guiding faces and said second guide disk is located therebetween.

5. A drill chuck as set forth in claim 1 wherein a cap nut on said shell-housing cooperating with said chuck head prevents axial displacement of said housing with relation to said chuck head.

6. A drill chuck as set forth in claim 1 wherein the frictionally coupled guide disk is provided with a guiding surface having rest-positions for said drill holding members.

7. A drill chuck as set forth in claim 1, wherein said rigidly coupled guide disk is integral with said shell-housing.

8. A drill chuck as set forth in claim 1, in which a plurality of guide disks are provided contiguous to a plurality of rigidly coupled disks, said latter disks being in the odd numbered positions and said frictionally coupled disks in the even numbered positions.

CARL WALTER BRÄCKER.

REFERENCES CITED

The following references are of record in the file of this patent:

UNITED STATES PATENTS

| Number | Name | Date |
| --- | --- | --- |
| 973,345 | Dalton | Oct. 18, 1910 |
| 2,063,344 | Schneider | Dec. 8, 1936 |
| 2,311,258 | Sjogren | Feb. 16, 1943 |
| 2,380,648 | Hite | July 31, 1945 |